US012742399B2

(12) United States Patent
Kondrashev et al.

(10) Patent No.: US 12,742,399 B2
(45) Date of Patent: Sep. 22, 2026

(54) BLADE TIP CLEARANCE SENSOR AND GAS TURBINE INCLUDING SAME

(71) Applicant: DOOSAN ENERBILITY CO., LTD., Changwon (KR)

(72) Inventors: Iurii Kondrashev, Gimhae (KR); Sung Hyun Kim, Gimhae (KR); Sam Sik Nam, Changwon (KR); Keun Won Choi, Changwon (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 19/302,027

(22) Filed: Aug. 17, 2025

(65) Prior Publication Data

US 2026/0063047 A1 Mar. 5, 2026

(30) Foreign Application Priority Data

Sep. 3, 2024 (KR) ........................ 10-2024-0119537

(51) Int. Cl.
*F01D 21/00* (2006.01)
*F01D 11/14* (2006.01)
(Continued)

(52) U.S. Cl.
CPC ............ *F01D 21/003* (2013.01); *F01D 11/14* (2013.01); *F05D 2270/821* (2013.01);
(Continued)

(58) Field of Classification Search
CPC .. F01D 21/003; F01D 11/14; F05D 2270/821; G01B 7/14; G01B 11/14; G01M 15/14
See application file for complete search history.

(56) References Cited

U.S. PATENT DOCUMENTS 4,011,017 A * 3/1977 Feuerstein ............ F01D 21/003 356/241.6
4,357,104 A * 11/1982 Davinson ............... G01B 11/14 250/559.38

(Continued)

FOREIGN PATENT DOCUMENTS

CN 1014815 A 11/1991
CN 110672055 B 3/2022

(Continued)

*Primary Examiner* — Phutthiwat Wongwian
*Assistant Examiner* — Rene D Ford
(74) *Attorney, Agent, or Firm* — Harvest IP Law, LLP

(57) ABSTRACT

Proposed are a blade tip clearance sensor and a gas turbine including the same. The blade tip clearance sensor includes a bushing portion which is fixed to a ring segment mounted on a turbine casing that accommodates a turbine blade therein and which has an internal space, a washer portion mounted on a lower portion of the internal space and provided with a first hollow portion, a flange portion provided on an upper surface of the washer portion and provided with a second hollow portion, a sensor probe which is inserted into the first and second hollow portions and which has a sensor cable, a spacer provided on an upper surface of the flange portion and configured to accommodate the sensor probe therein, and a locking screw which is provided on an upper surface of the spacer and which has a thread engaged with a thread of the bushing portion.

18 Claims, 10 Drawing Sheets

(51) Int. Cl.
*G01B 7/14* (2006.01)
*G01B 11/14* (2006.01)
*G01M 15/14* (2006.01)

(52) U.S. Cl.
CPC ................ *G01B 7/14* (2013.01); *G01B 11/14* (2013.01); *G01M 15/14* (2013.01)

(56) References Cited

U.S. PATENT DOCUMENTS

| | | | |
|---|---|---|---|
| 4,804,905 | A | 2/1989 | Ding |
| 6,661,222 | B1 | 12/2003 | Twerdochlib |
| 9,181,818 | B2 | 11/2015 | Warren |
| 10,222,200 | B2 | 3/2019 | Hatcher, Jr. |
| 2007/0063712 | A1 | 3/2007 | Crum |
| 2014/0356132 | A1 | 12/2014 | Leroux |

FOREIGN PATENT DOCUMENTS

| | | | |
|---|---|---|---|
| CN | 221612766 | U | 8/2024 |
| CN | 119353067 | A | 1/2025 |
| JP | 2006-183492 | A | 7/2006 |
| JP | 2006-189048 | A | 7/2006 |
| JP | 2014-232106 | A | 12/2014 |
| JP | 2016-142602 | A | 8/2016 |
| KR | 10-1608130 | B1 | 3/2016 |
| KR | 10-1957590 | B1 | 6/2019 |

* cited by examiner

BLADE TIP CLEARANCE SENSOR AND GAS TURBINE INCLUDING SAME

CROSS REFERENCE TO RELATED APPLICATION

The present application claims priority to Korean Patent Application No. 10-2024-0119537, filed Sep. 3, 2024, the entire contents of which are incorporated herein for all purposes by this reference.

BACKGROUND

Technical Field

The present disclosure relates to a blade tip clearance sensor and a gas turbine including the blade tip clearance sensor.

Description of the Related Art

A turbine is a mechanical apparatus that obtains a rotational force by an impulsive force or reaction force using a flow of a compressible fluid such as steam or gas. The turbine includes a steam turbine using a steam and a gas turbine using a high temperature combustion gas.

Among the steam turbine and the gas turbine, the gas turbine is mainly composed of a compressor, a combustor, and a turbine. The compressor is provided with an air inlet for introducing air, and a plurality of compressor vanes and a plurality of compressor blades are alternately arranged in a compressor housing.

The combustor supplies fuel to the compressed air compressed in the compressor and ignites a fuel-air mixture with a burner, thereby producing a high-temperature and high-pressure combustion gas.

The turbine has a plurality of turbine vanes and a plurality of turbine blades disposed alternately in a turbine casing. In addition, a rotor is arranged such that the rotor passes through centers of the compressor, the combustor, the turbine, and an exhaust chamber.

Both ends of the rotor are rotatably supported by bearings. In addition, a plurality of disks is fixed to the rotor so that respective blades connected to the disks are connected to each other, and a drive shaft such as a generator is connected to an end portion of the exhaust chamber.

Since such a gas turbine has no reciprocating mechanism such as a piston in a 4-stroke engine, so that there is no mutual frictional part such as a piston-cylinder. Therefore, the gas turbine has advantages in that consumption of lubricating oil is extremely small, amplitude as a characteristic of a reciprocating machine is greatly reduced, and high speed operation is possible.

Briefly describing the operation of the gas turbine, the compressed air in the compressor is mixed with fuel and combusted to produce a high-temperature combustion gas, and the combustion gas is injected toward the turbine. The injected combustion gas passes through the turbine vanes and the turbine blades to generate a rotational force, so that the rotor is rotated.

Document of Related Art (Patent Document 1) Korean Patent No. 10-1608130

SUMMARY

Accordingly, an objective of the present disclosure is to provide a blade tip clearance sensor and a gas turbine including the same, capable of securing operation stability and response reliability of the blade tip clearance sensor by stably fixing a probe to a specific position under harsh operating environments such as a high temperature environment, a high pressure environment, a high vibrational environment, and so on, wherein the probe is configured to monitor a clearance between a blade tip and a ring segment.

According to an aspect of the present disclosure, there is provided a blade tip clearance sensor including: a bushing portion fixed to a ring segment mounted on a turbine casing that accommodates a turbine blade therein, the bushing portion having an internal space; a washer portion mounted on a lower portion of the internal space of the bushing portion and provided with a first hollow portion; a flange portion provided on an upper surface of the washer portion and provided with a second hollow portion corresponding to the first hollow portion; a sensor probe inserted into the first hollow portion and the second hollow portion, the sensor probe having a sensor cable; a spacer provided on an upper surface of the flange portion and configured to accommodate the sensor probe therein; and a locking screw provided on an upper surface of the spacer, the locking screw having a thread engaged with and screw-coupled to a thread formed on an upper inner wall of the bushing portion.

In the blade tip clearance according to an aspect of the present disclosure, the bushing portion may be formed of an Inconel alloy that is a high-strength and high-temperature resistant material, may be provided with a first slot recessed downward from an upper end of the bushing portion, and may have a locking step formed inwardly on a lower end of the bushing portion.

In the blade tip clearance according to an aspect of the present disclosure, the bushing portion may be formed in a cylindrical shape having an internal space, the bushing portion may be welded and fixed to the ring segment, and a coupling hole to which the bushing portion is coupled may be formed in the ring segment.

In the blade tip clearance according to an aspect of the present disclosure, the washer portion may be formed of a stainless steel material having various thicknesses such that a mounting position of the sensor probe is capable of being adjusted within allowable setback dimensions.

In the blade tip clearance according to an aspect of the present disclosure, the flange portion may include a plurality of first cooling holes formed around the second hollow portion.

In the blade tip clearance according to an aspect of the present disclosure, a cooling channel that is in fluid connection with the first cooling holes may be formed on an outer circumferential surface of the sensor probe, and the sensor cable may be inserted into the first slot.

In the blade tip clearance according to an aspect of the present disclosure, the spacer may be formed in a hollow pipe shape, and may include a second slot having one side thereof open.

In the blade tip clearance according to an aspect of the present disclosure, the first slot and the second slot may be formed at positions corresponding to each other, and the sensor cable may be inserted into the first slot and the second slot.

In the blade tip clearance according to an aspect of the present disclosure, the locking screw may include a screw head for assembly, and may include a plurality of second cooling holes formed around the screw head.

In the blade tip clearance according to an aspect of the present disclosure, the plurality of second cooling holes may be in fluid communication with the cooling channel and the first cooling holes, so that cooling air introduced from a compressor or from the outside can flow toward a blade tip.

According to an aspect of the present disclosure, there is provided a gas turbine including: a compressor configured to draw in and compress external air; a combustor configured to mix fuel with air compressed in the compressor and to combust a mixture of fuel and the compressed air; a turbine in which a turbine blade and a turbine vane are mounted and which is configured such that the turbine blade is rotated by a combustion gas discharged from the combustor; and a blade tip clearance sensor fixed to a ring segment mounted on an inner circumferential surface of a turbine casing and configured to measure a clearance between a tip of the turbine blade and the ring segment. In the gas turbine according to an aspect of the present disclosure, the blade tip clearance sensor may include: a bushing portion fixed to the ring segment and provided with an internal space; a washer portion mounted on a lower portion of the internal space of the bushing portion and provided with a first hollow portion; a flange portion provided on an upper surface of the washer portion and provided with a second hollow portion corresponding to the first hollow portion; a sensor probe inserted into the first hollow portion and the second hollow portion, the sensor probe having a sensor cable; a spacer provided on an upper surface of the flange portion and configured to accommodate the sensor probe therein; and a locking screw provided on an upper surface of the spacer, the locking screw having a thread engaged with and screw-coupled to a thread formed on an upper inner wall of the bushing portion.

In the gas turbine according to an aspect of the present disclosure, the bushing portion may be formed of an Inconel alloy that is a high-strength and high-temperature resistant material, may be provided with a first slot recessed downward from an upper end of the bushing portion, and may have a locking step formed inwardly on a lower end of the bushing portion.

In the gas turbine according to an aspect of the present disclosure, the bushing portion may be formed in a cylindrical shape having an internal space, the bushing portion may be welded and fixed to the ring segment, and a coupling hole to which the bushing portion is coupled may be formed in the ring segment.

In the gas turbine according to an aspect of the present disclosure, the washer portion may be formed of a stainless steel material having various thicknesses such that a mounting position of the sensor probe is capable of being adjusted within allowable setback dimensions.

In the gas turbine according to an aspect of the present disclosure, the flange portion may include a plurality of first cooling holes formed around the second hollow portion.

In the gas turbine according to an aspect of the present disclosure, a cooling channel that is in fluid connection with the first cooling holes may be formed on an outer circumferential surface of the sensor probe, and the sensor cable may be inserted into the first slot.

In the gas turbine according to an aspect of the present disclosure, the spacer may be formed in a hollow pipe shape, and may include a second slot having one side thereof open.

In the gas turbine according to an aspect of the present disclosure, the first slot and the second slot may be formed at positions corresponding to each other, and the sensor cable may be inserted into the first slot and the second slot.

In the gas turbine according to an aspect of the present disclosure, the locking screw may include a screw head for assembly, and may include a plurality of second cooling holes formed around the screw head.

In the gas turbine according to an aspect of the present disclosure, the plurality of second cooling holes may be in fluid communication with the cooling channel and the first cooling holes, so that cooling air introduced from the compressor or from the outside can flow toward the tip of the turbine blade.

Other details of implementations according to various aspects of the present disclosure are included in the detailed description below.

According to an aspect of the present disclosure, the probe for monitoring the clearance between the blade tip and the ring segment is stably fixed to a specific position under harsh operating environments such as a high temperature environment, a high pressure environment, a high vibrational environment, and so on, so that the operation stability and the response reliability of the blade tip clearance sensor are capable of being secured.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
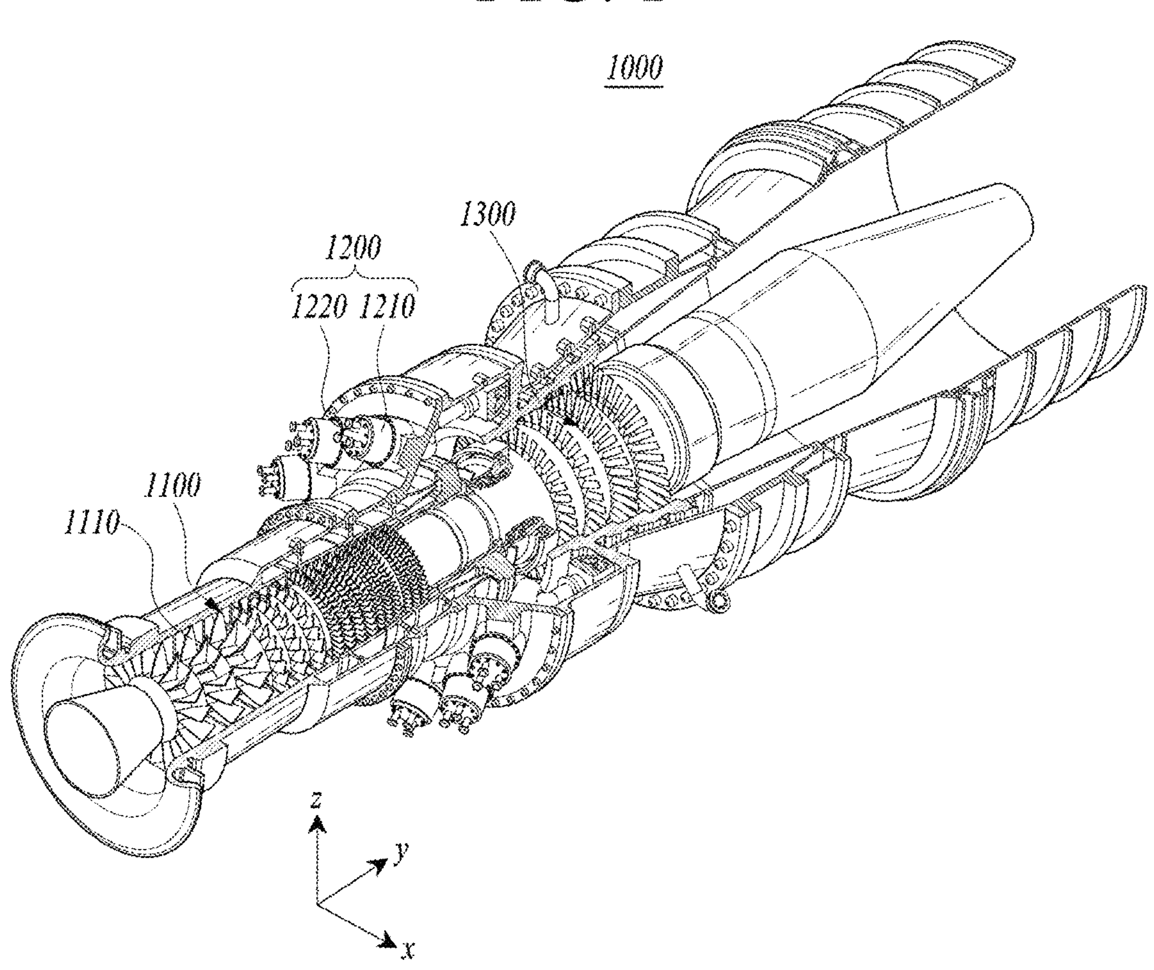
FIG. 1 is a partially cut-away perspective view of a gas turbine according to an embodiment of the present disclosure.

Various modifications and different embodiments will be described below in detail with reference to the accompanying drawings so that those skilled in the art can easily carry out the present disclosure. It should be understood, however, that the present disclosure is not intended to be limited to the specific embodiments, but the present disclosure includes all modifications, equivalents or replacements that fall within the spirit and scope of the disclosure as defined in the following claims.

The terminology used herein is for the purpose of describing specific embodiments only and is not intended to limit the scope of the present disclosure. Singular expressions include plural expressions unless the context clearly indicates otherwise. In the present disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Hereinafter, exemplary embodiments of the present disclosure will be described below in detail with reference to the accompanying drawings. It should be noted that like reference numerals refer to like parts throughout various drawings and exemplary embodiments. Furthermore, detailed descriptions related to well-known functions or configurations may be omitted in order not to unnecessarily obscure subject matters of the present disclosure. For the same reason, some components may be exaggerated, omitted, or schematically illustrated in the accompanying drawings.

Figure 2:
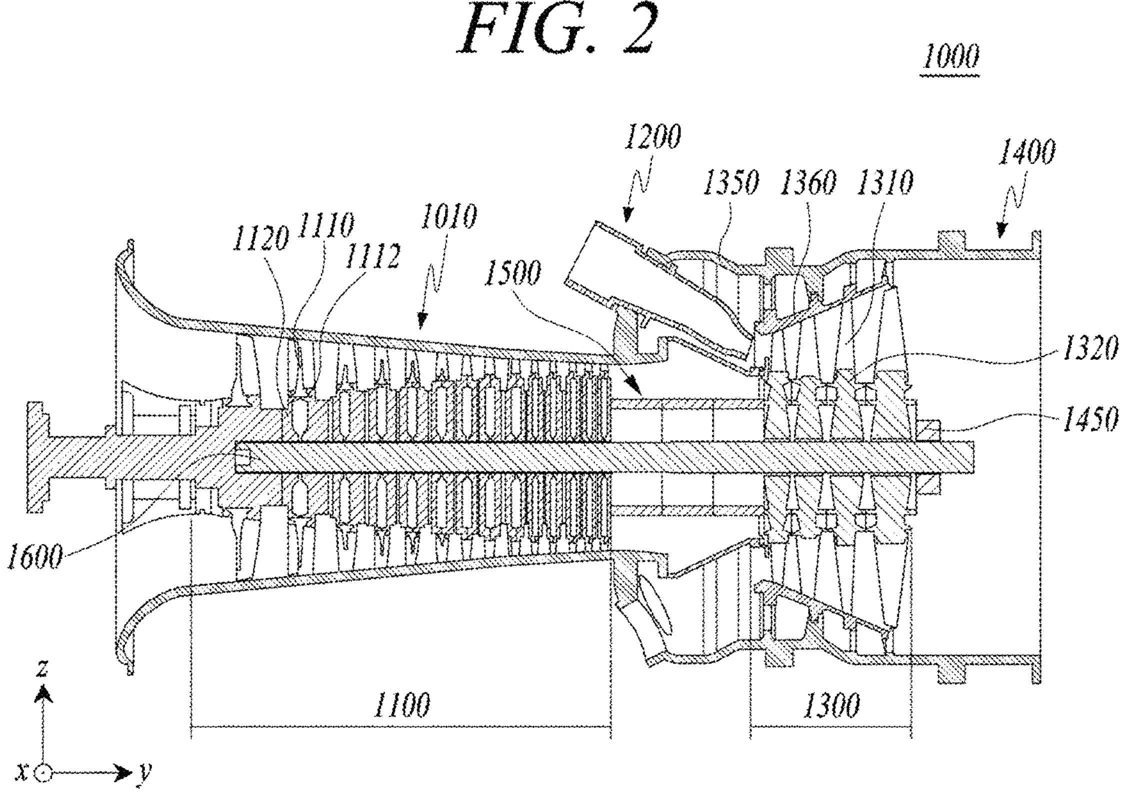
FIG. 2 is a cross-sectional view illustrating a schematic structure of the gas turbine according to an embodiment of the present disclosure.
Figure 3:
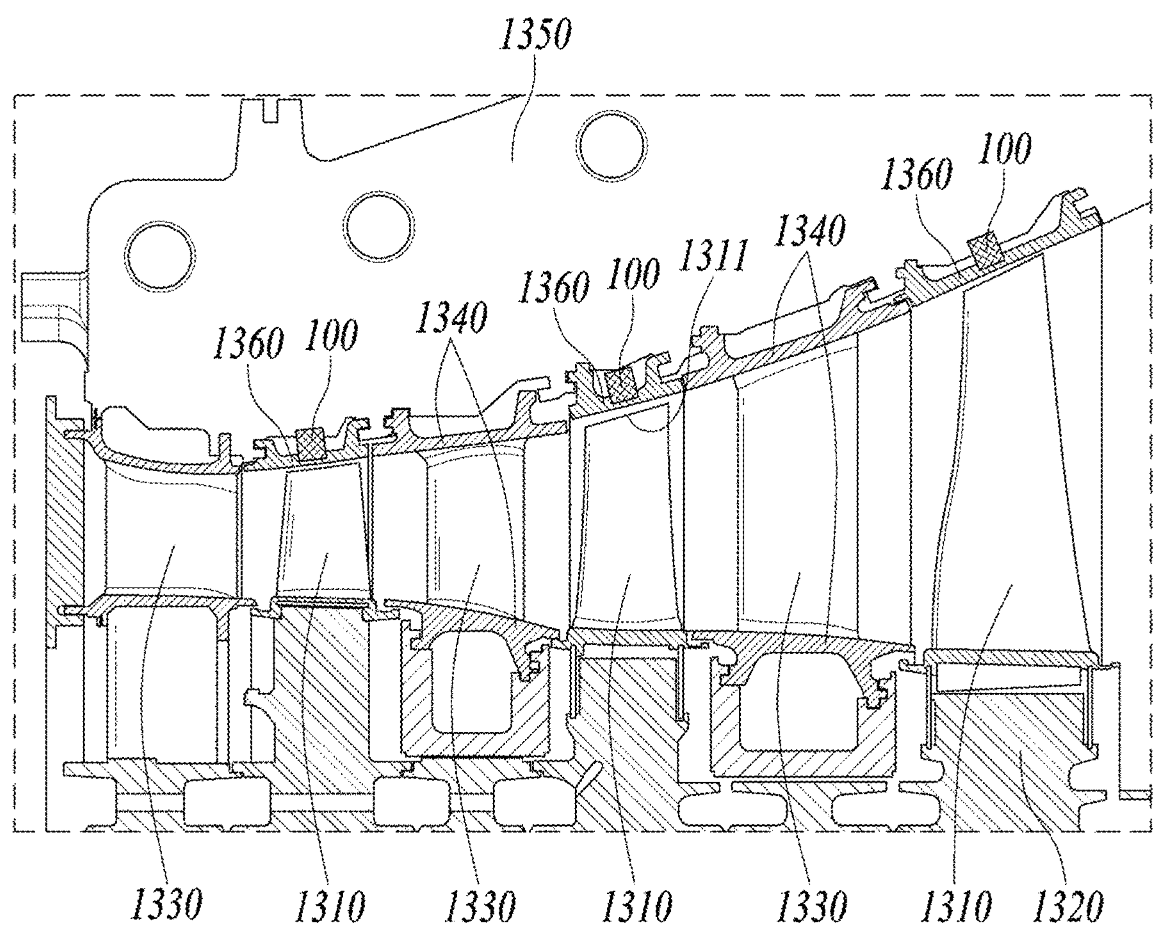
FIG. 3 is a partial cross-sectional view illustrating an internal structure of the gas turbine according to an embodiment of the present disclosure.

FIG. 1 is a partially cut-away perspective view of a gas turbine according to an embodiment of the present disclosure, FIG. 2 is a cross-sectional view illustrating a schematic structure of the gas turbine according to an embodiment of the present disclosure, and FIG. 3 is a partial cross-sectional view illustrating an internal structure of the gas turbine according to an embodiment of the present disclosure.

As illustrated in FIG. 1, a gas turbine 1000 according to an embodiment of the present disclosure includes a compressor 1100, a combustor 1200, and a turbine 1300. The compressor 1100 is provided with a plurality of blades 1110 mounted radially. The compressor 1100 may rotate the blades 1110, and air is compressed and moved by the rotation of the blades 1110. The sizes and installation angles of the blades 1110 may vary according to the installation positions of the blades 1110. In an embodiment, the compressor 1100 may be directly or indirectly connected to the turbine 1300, and may receive a portion of the power generated from the turbine 1300 and may rotate the blades 1110.

Air compressed from the compressor 1100 flows to the combustor 1200. The combustor 1200 includes a plurality of combustion chambers 1210 and a plurality of fuel nozzle modules 1220 disposed annularly.

As illustrated in FIG. 2, the gas turbine 1000 according to an embodiment of the present disclosure is provided with a housing 1010, and a diffuser 1400 to which a combustion gas passing through the turbine is provided on a rear side of the housing 1010. In addition, the combustor 1200 configured to receive and combust compressed air supplied thereto is disposed in front of the diffuser 1400.

In describing the present disclosure on the basis of a flow direction of air, the compressor 1100 is positioned on an upstream side of the housing 1010, and the turbine 1300 is disposed on a downstream side. In addition, a torque tube 1500 as a torque transmission member that transmits the rotational torque generated from the turbine 1300 to the compressor 1100 is disposed between the compressor 1100 and the turbine 1300.

The compressor 1100 is provided with a plurality of compressor rotor disks 1120 (for example, 14 compressor rotor disks), and each of the compressor rotor disks 1120 is fastened by a tie rod 1600 such that each of the compressor rotor disks 1120 is not spaced apart in an axial direction.

Specifically, each of the compressor rotor disks 1120 is aligned along the axial direction while being in a state in which the tie rod 1600 constituting a rotary shaft passes approximately through a central portion of each of the compressor rotor disks 1120. Here, adjacent compressor rotor disks 1120 are disposed such that facing surfaces thereof are in tight contact with each other by the tie rod 1600 so that the adjacent compressor rotor disks 1120 cannot rotate relative to each other.

The plurality of blades 1110 is radially coupled to an outer circumferential surface of each of the compressor rotor disks 1120. Each of the blades 1110 is provided with a dovetail portion 1112, and is fastened to each of the compressor rotor disks 1120.

Vanes (not illustrated) fixed to and disposed in the housing are positioned between each of the compressor rotor disks 1120. Unlike the compressor rotor disks, the vanes are fixed such that the vanes do not rotate, and the vanes serve to align the flow of compressed air that has passed through the blades 1110 of the compressor rotor disks 1120 so that the air is guided to the blades 1110 of the compressor rotor disks 1120 positioned at the downstream side.

A fastening method of the dovetail portion 1112 may include a tangential type and an axial type. The fastening method may be selected according to the required structure of a commercially available gas turbine, and may have a commonly known dovetail shape or a commonly known fir-tree shape. In some cases, the blade may be fastened to the rotor disk using a fastening device other than the shape described above, for example, using a fixing tool such as a key or a bolt.

The tie rod 1600 is disposed such that the tie rod 1600 passes through central portions of the plurality of compressor rotor disks 1120 and a plurality of turbine rotor disks 1320, and the tie rod 1600 may be provided as a single tie rod or a plurality of tie rods. A first end portion of the tie rod 1600 is fastened to the compressor rotor disk that is positioned at the most upstream side, and a second end portion of the tie rod 1600 is fastened by a fixing nut 1450.

A shape of the tie rod 1600 is not limited to the shape illustrated in FIG. 2, and may be formed in various structures according to the gas turbine. That is, the shape in which one tie rod passes through the central portions of the rotor disks as illustrated in the drawing may be realized, another shape in which a plurality of tie rods is arranged circumferentially may be realized, or a combination of the two shapes described above may be realized.

Although not illustrated in the drawings, in order to increase the pressure of fluid and then adjust an inflow angle of the fluid entering into an inlet of the combustor to a designed inflow angle, a deswirler serving as a guide vane may be installed at the rear stage of the diffuser.

The combustor 1200 mixes fuel with the introduced compressed air, combusts a fuel-air mixture to produce a high-temperature and high-pressure combustion gas with a high energy, and increases the temperature of the combustion gas to a temperature at which the combustor and the turbine components are able to be resistant to heat through an isobaric combustion process.

A plurality of combustors constituting a combustion system of the gas turbine may be arranged in the housing in a form of a cell. Each of the combustors may include a burner having a fuel injection nozzle and so on, a combustor liner forming a combustion chamber, and a transition piece serving as a connection part between the combustor and the turbine.

In detail, the combustor liner provides a combustion space in which fuel injected by the fuel injection nozzle is mixed with the compressed air supplied from the compressor and combusted. Such a combustor liner may include a flame container providing the combustion space in which fuel mixed with air is combusted, and may include a flow sleeve forming an annular space while surrounding the flame container. In addition, the fuel injection nozzle is coupled to a front end of the combustor liner, and an ignition plug is coupled to a side wall of the combustor liner.

The transition piece is connected to a rear end of the combustor liner such that the combustion gas combusted by the ignition plug is capable of being transferred toward the turbine. An outer wall of such a transition piece is cooled by compressed air supplied from the compressor so as to prevent the transition piece from being damaged due to the high temperature of the combustion gas.

To this end, the transition piece is provided with holes for cooling such that air is capable of being injected into the inside of the transition piece through the holes, and the compressed air cools the inside of the transition piece and then flows toward the combustor liner.

The compressed air that has cooled the transition piece may flow into an annular space of the combustor liner, and may be supplied as a cooling air through the holes formed in the flow sleeve from the outside of the flow sleeve to an outer wall of the combustor liner.

The high-temperature and high-pressure combustion gas ejected from the combustor is supplied to the turbine 1300. The supplied high-temperature and high-pressure combustion gas expands and applies impingement or reaction force to a turbine rotation wing to generate rotational torque. A portion of the obtained rotational torque is transmitted via the torque tube 1500 to the compressor, and the remaining portion which is the excessive torque is used to drive a generator and so on.

The turbine 1300 basically has a structure similar to the compressor. That is, the turbine 1300 includes the plurality of turbine rotor disks 1320 similar to the compressor rotor disks of the compressor. Therefore, the plurality of turbine rotor disks 1320 also includes a plurality of turbine blades 1310 arranged radially. The turbine blades 1310 may also be coupled to the turbine rotor disks 1320 in a dovetail coupling manner or the like. In addition, a plurality of turbine vanes 1330 fixed to a turbine casing 1350 is provided between the turbine blades 1310, and is configured to guide a flow direction of the combustion gas passing through the turbine blades 1310.

By a turbine vane platform 1340 coupled to an inner end portion and an outer end portion of the turbine vane 1330, the turbine vane 1330 is mounted fixedly in the turbine casing 1350. On the other hand, a ring segment 1360 is mounted on a position of the inside of the turbine casing 1350 facing a blade tip 1311 that is an outer end portion of the rotated turbine blade 1310 such that a predetermined clearance is formed between the ring segment 1360 and the blade tip 1311.

The ring segment 1360 prevents leakage of the high-temperature and high-pressure combustion gas that rotates the rotor, thereby increasing the efficiency of the gas turbine. The ring segment 1360 is mounted in the turbine casing 1350 accommodating the turbine blade 1310 such that the ring segment 1360 surrounds an outer periphery of the turbine blade 1310 that is rotated.

Meanwhile, the clearance between the rotating blade tip 1311 and the ring segment 1360 is an important variable that secures efficiency and safety of the gas turbine. For example, when the clearance between the blade tip 1311 and the ring segment 1360 is increased by 0.125 mm, the efficiency of the gas turbine is reduced by 0.5%.

Therefore, in the present disclosure, a blade tip clearance sensor 100 for monitoring the clearance between the blade tip 1311 and the ring segment 1360 is provided, the blade tip clearance sensor 100 being capable of stably mounting and maintaining a sensor probe at a specific position and securing an operation stability in a harsh operation environment such as a high temperature environment, a high pressure environment, a high vibrational environment, or the like. Such a blade tip clearance sensor 100 will be described with reference to FIG. 4 to FIG. 10.

Figure 4:
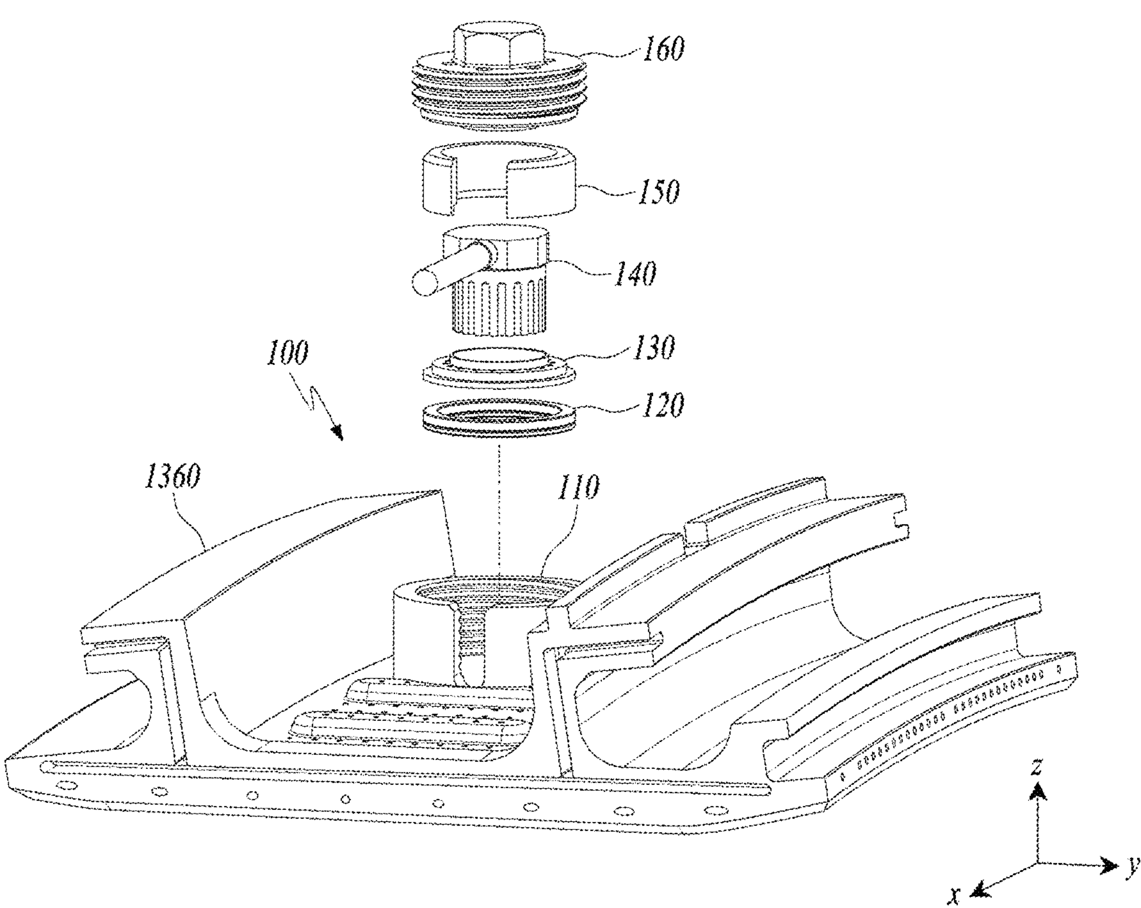
FIG. 4 is an exploded perspective view illustrating a blade tip clearance sensor mounted on a ring segment of the gas turbine according to an embodiment of the present disclosure.
Figure 5A:
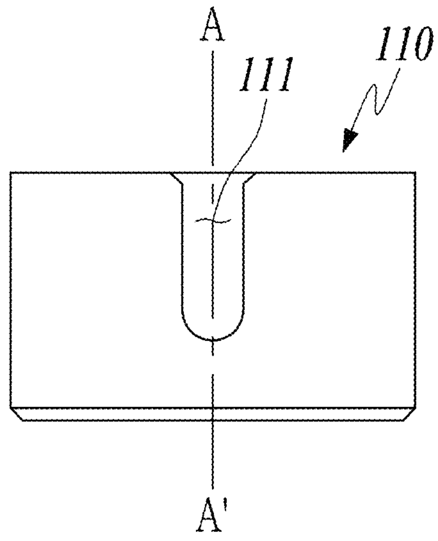
FIG. 5A and FIG. 5B are views illustrating a bushing portion of the blade tip clearance sensor according to an embodiment of the present disclosure.
Figure 5B:
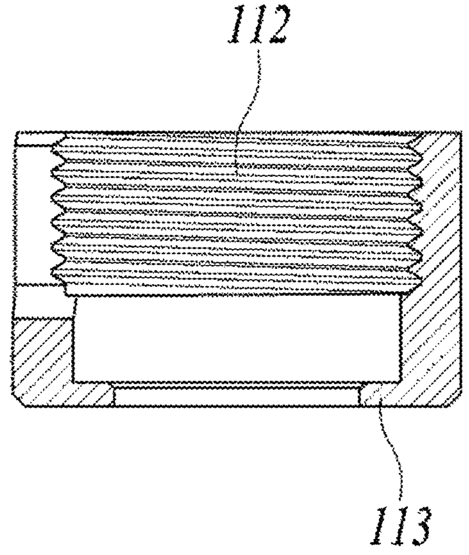
Figure 6:
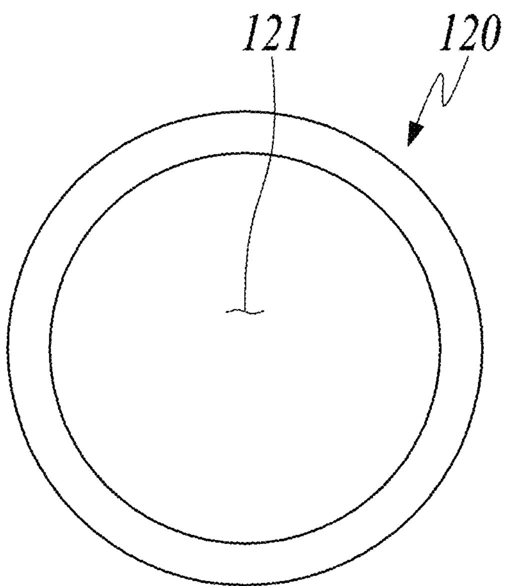
FIG. 6 is a view illustrating a washer portion of the blade tip clearance sensor according to an embodiment of the present disclosure.
Figure 7A:
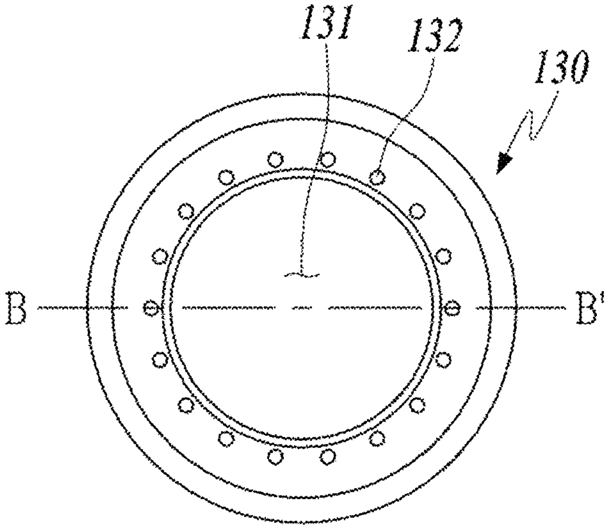
FIG. 7A and FIG. 7B are views illustrating a flange portion of the blade tip clearance sensor according to an embodiment of the present disclosure.
Figure 7B:
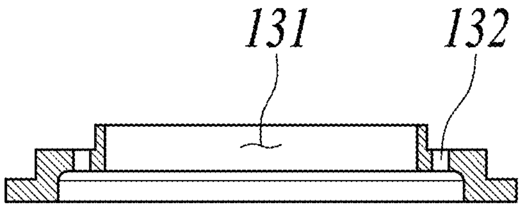
Figure 8:
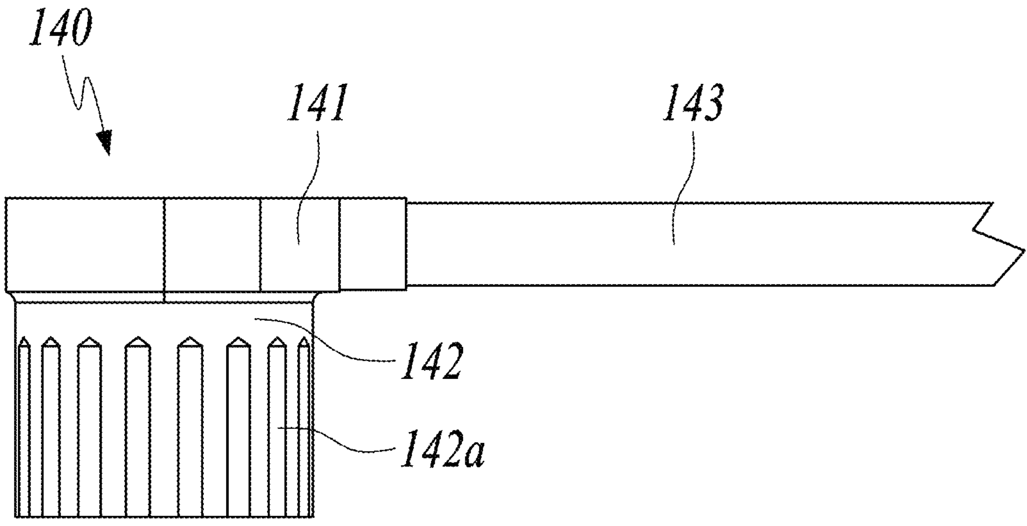
FIG. 8 is a view illustrating a sensor probe of the blade tip clearance sensor according to an embodiment of the present disclosure.
Figure 9:
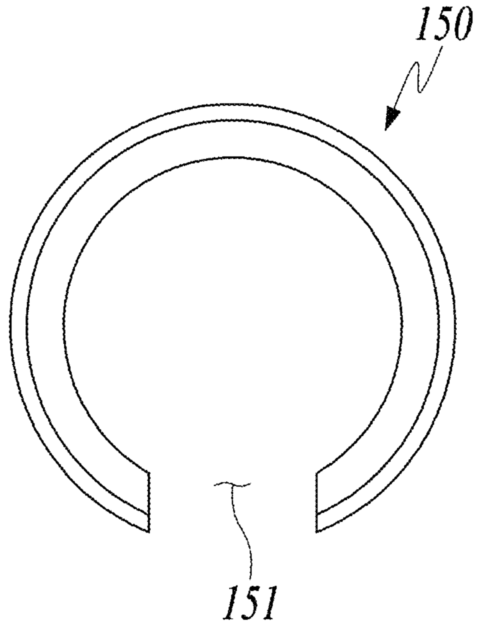
FIG. 9 is a view illustrating a spacer of the blade tip clearance sensor according to an embodiment of the present disclosure.
Figure 10A:
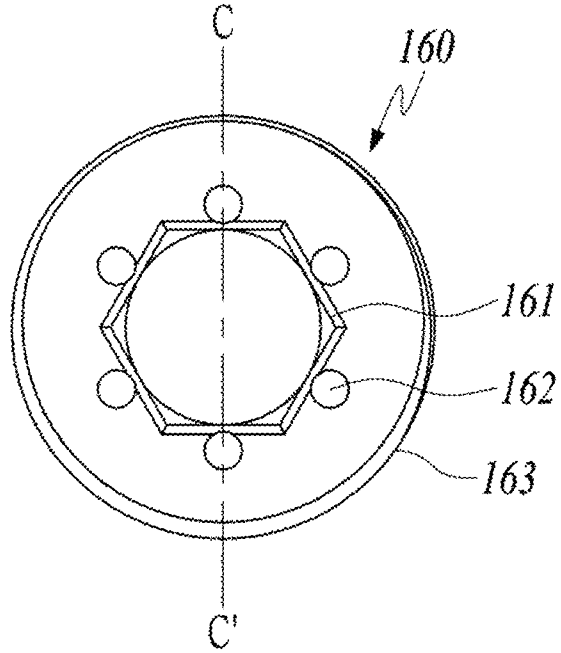
FIG. 10A and FIG. 10B are views illustrating a locking screw of the blade tip clearance sensor according to an embodiment of the present disclosure.
Figure 10B:
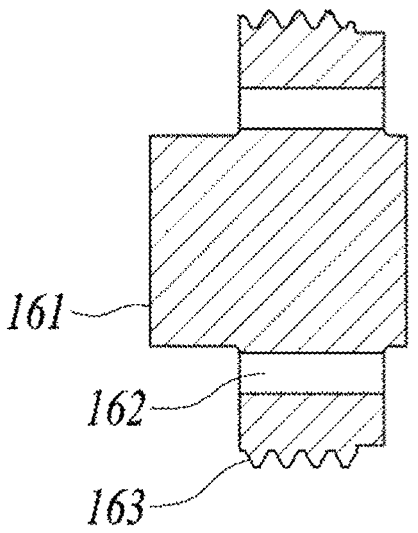

FIG. 4 is an exploded perspective view illustrating a blade tip clearance sensor mounted on a ring segment of the gas turbine according to an embodiment of the present disclosure, FIG. 5A and FIG. 5B are views illustrating a bushing portion of the blade tip clearance sensor according to an embodiment of the present disclosure, FIG. 6 is a view illustrating a washer portion of the blade tip clearance sensor according to an embodiment of the present disclosure, FIG. 7A and FIG. 7B are views illustrating a flange portion of the blade tip clearance sensor according to an embodiment of the present disclosure, FIG. 8 is a view illustrating a sensor probe of the blade tip clearance sensor according to an embodiment of the present disclosure, FIG. 9 is a view illustrating a spacer of the blade tip clearance sensor according to an embodiment of the present disclosure, and FIG. 10A and FIG. 10B are views illustrating a locking screw of the blade tip clearance sensor according to an embodiment of the present disclosure.

Referring to FIG. 4, the blade tip clearance sensor 100 according to an embodiment of the present disclosure includes a bushing portion 110, a washer portion 120, a flange portion 130, a sensor probe 140, a spacer 150, and a locking screw 160. Throughout the specification, as depicted in FIG. 4, the y-direction refers to an axial direction along an extension direction of the tie rod, z-direction refers to a radial direction having the tie rod as a radial center, and direction refers to a circumferential direction along a rotation direction of the blades. An upper direction refers to a radially outward direction and a low direction refers to a radially inward direction, along the z-direction. The z-direction may be referred to as a vertical direction.

The bushing portion 110 is formed of an Inconel alloy that is a high-strength and high-temperature resistant material, is formed in a cylindrical shape having an internal space. The busing portion 110 may be integrally welded and fixed to the ring segment 1360. A coupling hole to which the bushing portion 110 is coupled is formed in the ring segment 1360. In addition, the washer portion 120, the flange portion 130, the sensor probe 140, the spacer 150, and the locking screw 160 are sequentially coupled to the internal space of the bushing portion 110.

FIG. 5A is a front view illustrating the bushing portion 110, and FIG. 5B is a cross-sectional view taken along line A-A' in FIG. 5A. Referring to FIG. 5A and FIG. 5B, the bushing portion 110 includes a first slot 111 recessed downward from an upper end thereof to a predetermined depth. A sensor cable 143 of the sensor probe 140 may inserted through the first slot 111 without interference with other components.

A thread 112 is formed on an upper inner wall of the bushing portion 110, and the thread 112 may be screw-coupled to a thread of the locking screw 160 by being engaged with the thread. A locking step 113 is formed inwardly on a lower end of the bushing portion 110 (i.e., extended inwardly from the lower end of the busing portion), so that the washer portion 120, the flange portion 130, the sensor probe 140, the spacer 150, and so on are capable of being sequentially stacked in the bushing portion 110.

The washer portion 120 is formed in a circular ring shape, and is inserted into and mounted in a lower portion of the internal space of the bushing portion 110. Referring to FIG. 6, the washer portion 120 is supported by the locking step 113, and includes a first hollow portion 121.

The washer portion 120 may be formed of a stainless steel material having various thicknesses such that a mounting position of the sensor probe 140 is capable of being adjusted within allowable mounting dimensions (setback dimensions). That is, a set of washer portions 120 having different thicknesses may be provided, and the blade tip clearance sensor 100 may be assembled using a washer portion 120 having a thickness selected to satisfy the setback dimensions.

The flange portion 130 is formed in a circular ring shape having a stepped structure, and is provided on an upper surface of the washer portion 120. FIG. 7A is a plan view illustrating the flange portion 130, and FIG. 7B is a cross-sectional view taken along line B-B' in FIG. 7A. Referring to FIG. 7A and FIG. 7B, the flange portion 130 is provided with a second hollow portion 131 corresponding to the first hollow portion 121, and a plurality of first cooling holes 132 arranged in a circular shape is formed around the second hollow portion 131.

Specifically, the inner surface of the flange portion 130 includes an inner stepped portion dividing the second hollow portion 131 into an upper part of the second hollow portion 131 and a lower part of the second hollow portion 131, where the lower part of the second hollow portion 131 has a larger diameter than the upper part of the second hollow portion 131. The lower part of the second hollow portion 131 has an inner upper surface at the inner stepped portion. Each of the plurality of first cooling holes 132 is extended in a vertical direction from a port at an upper surface of the flange portion 130 (i.e., an upper port) to a port at the inner upper surface at the inner stepped portion (i.e., a lower port).

According to an embodiment, a wall defining the upper part of the second hollow portion 131 comprises an outer stepped portion such that an upper surface of the flange portion 130 is divided into a higher upper surface and a lower upper surface. The lower upper surface is located radially outer than the higher upper surface relative to the center of the flange portion 130. The upper port of each of the plurality of first cooling holes 132 is formed on the lower upper surface.

According to an embodiment, the higher upper surface is configured to support the sensor head 141 of the sensor probe 140 when assembled. The sensor head 141 and the lower upper surface are vertically spaced apart when assembly, creating an additional space. Such additional space further enhances the communication of the cooling air.

The sensor probe 140 is inserted into the second hollow portion 131 formed in the flange portion 130 and into the first hollow portion 121 formed in the washer portion 120, and is configured to measure a clearance between the blade tip 1311 and the ring segment 1360. In addition, the sensor probe 140 may measure a clearance between the blade tip 1311 and the turbine casing 1350 by adding a fixed clearance between the ring segment 1360 and the turbine casing 1350 to the clearance between the blade tip 1311 and the ring segment 1360.

Referring to FIG. 8, the sensor probe 140 includes a sensor head 141, a sensor body 142, and the sensor cable 143.

The sensor head 141 is formed as a plate member having a predetermined shape, and a portion of the sensor cable 143 is mounted therein.

The sensor body 142 extends downward from a lower surface of the sensor head 141, and is inserted into the first hollow portion 121 and the second hollow portion 131. A plurality of cooling channels **142*a* is formed on an outer circumferential surface of the sensor body 142, each extending downward and recessed to a predetermined depth. The plurality of cooling channels 142*a* is in fluid communication with the plurality of first cooling holes 132 described above and a plurality of second cooling holes 162 that will be described below, so that cooling air introduced from the compressor 1100** or from the outside can flow therethrough.

A sensing element for detecting a distance to the blade tip 1311 is mounted in the sensor head 141 and the sensor body 142. The sensing element operates in a non-contact manner, and may be implemented as a capacitive sensor, an inductive sensor, or an eddy current sensor. The sensing element is configured to convert a signal generated in response to movement of the blade tip 1311 into an electrical signal, which is transmitted to an external signal processing circuit (not illustrated) through the sensor cable 143.

The sensor cable 143 may be inserted through the first slot 111 formed in the bushing portion 110 and a second slot 151 formed in the spacer 150 without interference with other components.

The spacer 150 is provided on an upper surface of the flange portion 130, and accommodates the sensor probe 140 therein. Referring to FIG. 9, the spacer 150 is formed in a hollow pipe shape, and includes the second slot 151 having one side thereof open. That is, the second slot 151 is formed by extending from the upper end to the lower end of the spacer 150. The second slot 151 is formed at a position corresponding to the first slot 111.

The hollow pipe shape of the spacer 150 includes a circumferential wall. An inner surface of the circumferential wall is disposed radially outer than the plurality of first cooling holes 132 of the flange portion 130 relative to the center of the flange portion 130 and the space 150, which are concentric. Such configuration allows an air coming into the hollow pipe shape of the spacer 150 to flow into the plurality of first cooling holes 132.

The locking screw 160 is provided on an upper surface of the spacer 150. FIG. 10A is a plan view illustrating the spacer 150, and FIG. 10B is a cross-sectional view taken along line C-C' in FIG. 10A. Referring to FIG. 10A and FIG. 10B, the locking screw 160 includes a screw head 161 for assembly, the plurality of second cooling holes 162 formed around the screw head 161, and a thread 163 formed on an outer surface of the locking screw 160.

The plurality of second cooling holes 162 is in fluid communication with the cooling channels **142*a* and the first cooling holes 132, allowing cooling air introduced from the compressor 1100 or from the outside to flow downward (a direction toward the blade tip). The locking screw 160 may be screw-coupled to the bushing portion 110 by engaging the thread 163 with the thread 112 formed on the upper inner wall of the bushing portion 110**.

Figure 11:
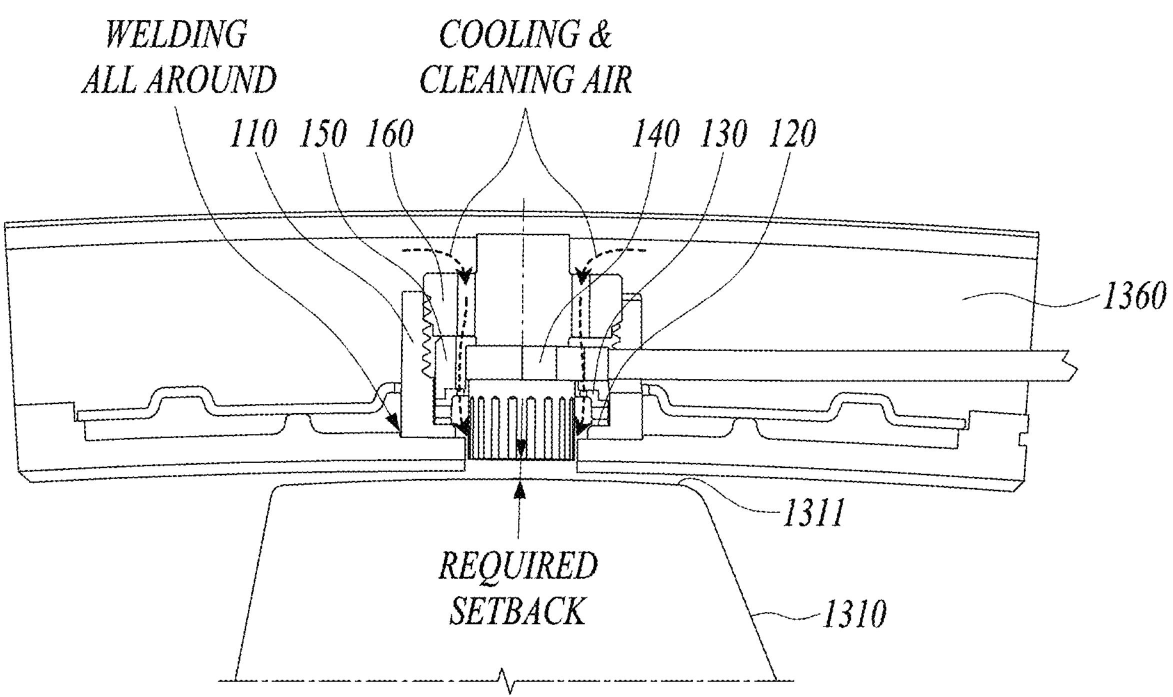
FIG. 11 is a cross-sectional view taken along an x-axis direction, corresponding to an assembled state of the components illustrated in FIG. 4, and illustrating a state in which the blade tip clearance sensor according to an embodiment of the present disclosure is mounted on the ring segment.

FIG. 11 is a cross-sectional view taken along the x-direction, the cross-sectional view illustrating a state in which the blade tip clearance sensor according to an embodiment of the present disclosure is assembled and mounted on the ring segment.

Referring to FIG. 11, cooling air introduced from the compressor 1100 or from the outside is introduced into the second cooling holes 162, the introduced cooling air then passes through the inner portion of the spacer 150 and the first cooling holes 132 and flows through the cooling channels 142*a*, and then is subsequently discharged toward the blade tip 1311. During this process, the sensor probe 140 is cooled, so that the reliability of the sensor probe 140 operated under harsh operating environments such as a high temperature environment, a high pressure environment, a high vibrational environment, and so on f the gas turbine is secured. Furthermore, the structure in which the washer portion 120, the flange portion 130, the sensor probe 140, the spacer 150, and the locking screw 160 are tightly stacked within the internal space of the bushing portion 110 enables the sensor probe 140 to be stably fixed, even under the harsh operating environments such as the high temperature environment, the high pressure environment, the high vibrational environment, and so on of the gas turbine. In addition, by providing the washer portions 120 in a set with various thicknesses, the structure can flexibly accommodate different setback dimensions using one selected from the set of the washer portions 120.

While one or more exemplary embodiments have been described with reference to the accompanying drawings, it will be apparent to those skilled in the art that various variations and modifications may be made by adding, changing, or removing components without departing from the spirit and scope of the present disclosure as defined in the appended claims, and these variations and modifications fall within the spirit and scope of the present disclosure as defined in the appended claims. In addition, it is noted that any one feature of an embodiment of the present disclosure described in the specification may be applied to another embodiment of the present disclosure.

What is claimed is:

1. A blade tip clearance sensor comprising:

a bushing portion fixed to a ring segment mounted on a turbine casing that accommodates a turbine blade therein, the bushing portion having an internal space;

a washer portion arranged in a lower portion of the internal space of the bushing portion and provided with a first hollow portion;

a flange portion formed in a circular ring shape having a stepped structure, provided on an upper surface of the washer portion and provided with a second hollow portion corresponding to the first hollow portion;

a sensor probe inserted into the first hollow portion and the second hollow portion, the sensor probe having a sensor head, a sensor body and a sensor cable;

a spacer provided on an upper surface of the flange portion and configured to accommodate the sensor probe therein; and a locking screw provided on an upper surface of the spacer, the locking screw having a thread engaged with and screw-coupled to a thread formed on an upper inner wall of the bushing portion, wherein the bushing portion is formed in a cylindrical shape having an internal space, the bushing portion is welded and fixed to the ring segment, and a coupling hole to which the bushing portion is coupled is formed in the ring segment.

2. The blade tip clearance sensor of claim 1, wherein the bushing portion is provided with a first slot recessed downward from an upper end of the bushing portion, and has a locking step formed inwardly on a lower end of the bushing portion.

3. The blade tip clearance sensor of claim 2, wherein the flange portion comprises a plurality of first cooling holes formed around the second hollow portion.

4. The blade tip clearance sensor of claim 3, wherein a cooling channel that is in fluid connection with the first cooling holes is formed on an outer circumferential surface of the sensor probe, and the sensor cable is inserted into the first slot.

5. The blade tip clearance sensor of claim 4, wherein the spacer is formed in a hollow pipe shape, and comprises a second slot having one side thereof open.

6. The blade tip clearance sensor of claim 5, wherein the first slot and the second slot are formed at positions corresponding to each other, and the sensor cable is inserted into the first slot and the second slot.

7. The blade tip clearance sensor of claim 6, wherein the locking screw comprises a screw head for assembly, and comprises a plurality of second cooling holes formed around the screw head.

8. The blade tip clearance sensor of claim 7, wherein the plurality of second cooling holes is in fluid communication with the cooling channel and the first cooling holes, so that cooling air introduced from a compressor or from the outside can flow toward a blade tip.

9. The blade tip clearance sensor of claim 1, wherein the washer portion is formed of a stainless steel material having a thickness suitable for allowable setback dimension of a mounting position of the sensor probe.

10. A gas turbine comprising:

a compressor configured to draw in and compress external air;

a combustor configured to mix fuel with air compressed in the compressor and to combust a mixture of fuel and the compressed air;

a turbine in which a turbine blade and a turbine vane are mounted and which is configured such that the turbine blade is rotated by a combustion gas discharged from the combustor; and a blade tip clearance sensor fixed to a ring segment mounted on an inner circumferential surface of a turbine casing and configured to measure a clearance between a tip of the turbine blade and the ring segment, wherein the blade tip clearance sensor comprises:

a bushing portion fixed to the ring segment and provided with an internal space;

a washer portion arranged in a lower portion of the internal space of the bushing portion and provided with a first hollow portion;

a flange portion formed in a circular ring shape having a stepped structure, provided on an upper surface of the washer portion and provided with a second hollow portion corresponding to the first hollow portion;

a sensor probe inserted into the first hollow portion and the second hollow portion, the sensor probe having a sensor head, a sensor body and a sensor cable;

a spacer provided on an upper surface of the flange portion and configured to accommodate the sensor probe therein; and a locking screw provided on an upper surface of the spacer, the locking screw having a thread engaged with and screw-coupled to a thread formed on an upper inner wall of the bushing portion, wherein the bushing portion is formed in a cylindrical shape having an internal space, the bushing portion is welded and fixed to the ring segment, and a coupling hole to which the bushing portion is coupled is formed in the ring segment.

11. The gas turbine of claim 10, wherein the bushing portion is provided with a first slot recessed downward from an upper end of the bushing portion, and has a locking step formed inwardly on a lower end of the bushing portion.

12. The gas turbine of claim 11, wherein the flange portion comprises a plurality of first cooling holes formed around the second hollow portion.

13. The gas turbine of claim 12, wherein a cooling channel that is in fluid connection with the first cooling holes is formed on an outer circumferential surface of the sensor probe, and the sensor cable is inserted into the first slot.

14. The gas turbine of claim 13, wherein the spacer is formed in a hollow pipe shape, and comprises a second slot having one side thereof open.

15. The gas turbine of claim 14, wherein the first slot and the second slot are formed at positions corresponding to each other, and the sensor cable is inserted into the first slot and the second slot.

16. The gas turbine of claim 15, wherein the locking screw comprises a screw head for assembly, and comprises a plurality of second cooling holes formed around the screw head.

17. The gas turbine of claim 16, wherein the plurality of second cooling holes is in fluid communication with the cooling channel and the first cooling holes, so that cooling air introduced from the compressor or from the outside can flow toward the tip of the turbine blade.

18. The gas turbine of claim 10, wherein the washer portion is formed of a stainless steel material having a thickness suitable for allowable setback dimension of a mounting position of the sensor probe.

* * * * *